United States Patent Office 3,563,723
Patented Feb. 16, 1971

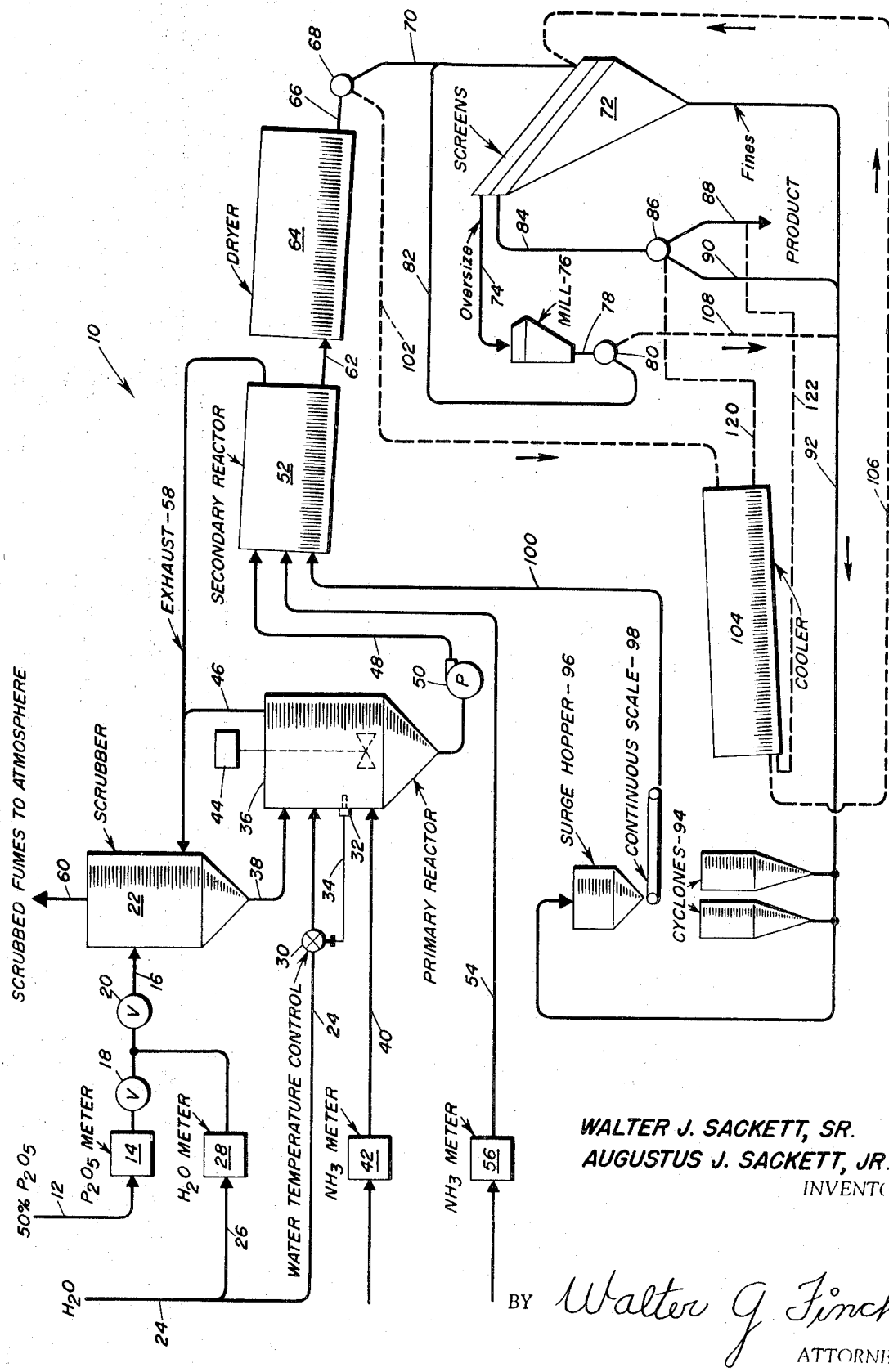

3,563,723
METHOD AND SYSTEM FOR MANUFACTURING AMMONIUM PHOSPHATES
Walter J. Sackett, Sr., Baltimore, and Augustus J. Sackett, Jr., Towson, Md., assignors to A. J. Sackett & Sons Co., Baltimore, Md., a corporation of Maryland
Continuation of application Ser. No. 471,919, July 14, 1965. This application Apr. 2, 1969, Ser. No. 822,797
Int. Cl. C05b 7/00
U.S. Cl. 71—34
5 Claims

ABSTRACT OF THE DISCLOSURE

An improved plant and method for manufacturing ammonium phosphates from phosphoric acid and ammonia is described. The process combines the ammonia with a diluted and somewhat preneutralized acid in a primary reactor, the partial prentutralization being done in a scrubber spraying acid and water on collected vapors. This recovers the ammonia from vapors given ofl subsequently in both the primary reactor mentioned and a subsequent secondary reactor. Thus, importantly, the scrubber, not only recovers waste ammonia, but feeds it back to the system and delivers practically purified water vapor to the atmosphere. The reactivetemperature rise in the primary reator is controlled by a thermostatically operated water supply valve which adds cold water in proportion to the neutralizing activity. The effluent from the scrubber not only is the reduced strength acid but also contains some mon-ammonium phosphate. From the primary reactor a water solution of di-ammonium and mon-ammonium phosphates having a desirable mol ratio between 1.25 and 1.45 is delivered to the secondary reactor. Selected feed-back paths are arranged whereby the resulting solid product can be regenerated until all is of a desired size granule with no waste.

This invention relates generally to plant food processing plants, and more particularly it pertains to a method and plant for manufacturing ammonium phosphates in granular form, although it could readily be used for processing other types of plant foods. This patent application is a continuation of applicant's U.S. patent application Ser. No. 471,919, filed July 14, 1965 and now abandoned, for "Method and System for Manufacturing Ammonium Phosphates."

When ammonia is combined with phosphoric acid in the presence of water, a reaction ocurs which results in the neutralization of the acid and the production of a solid product which is extensively used as a fertilizer.

Several problems exist in such a process, especially in a continuous plant due to losses incurred from fuming, heat from reaction, the handling of rapidly changing forms of the ingredients, and the desirability of a uniform product both chemically and mechanically.

It is an object of this invention, therefore, to provide a manufacturing process as well as a novel plant for the continuous production of granular ammonium phosphate fertilizers wherein the most optimum reaction can occur between the constituents for the least losses thereofand best utilization of the heats of reaction.

Another object of this invention is to provide a plant of this nature which is so organized that the forms of the product during the reactive steps is maintained mechanically uniform for best handling between machine elements so that frequent shutdowns will be unnecessary for clean-out purposes.

Other objects and attendant advantages of this invention are to provide a system for manufacturing plant foods which is economical to construct and operate, and which is efficient and reliable in operational use, and which is easy to maintain and install.

Other objects and attendant advantages of this invention will become more readily apparent and understood from the following detailed specification and single sheet of accompanying drawings.

Referring now to the details of the drawing, reference numeral 10 indicates generally a plant for manufacturing phosphate fertilizers in granular form. This plant 10 consists of a delivery line 12 carrying technical grade of 50% phosphoric acid ($P_2O_5$). The acid from line 12 is metered and the flow rate controlled by a meter 14 and a valve 18.

Cold water from a line 24 is added to this flow of acid through a branch 26 and a meter 28 and the mixture is then introduced through a control valve 20 and line 16 to a tower or scrubber 22 of stainless steel. The function of this scrubber 22 is reduce the strength of the acid to 40% and further to function as a preneutralizer as will be related.

The effluent discharged from the scrubber 22 through a line 38 is liquid and it flows freely into a primary reactor 36. This reactor 36 receives a water flow from the cold water line 24 as well as anhydrous ammonia ($NH_3$) through line 40. The water flow is valved by a solenoid valve 30 which is controlled by an electric signal over line 34 from a thermostat probe 32 attached to the reactor 36. The ammonia flow is controlled elsewhere and metered by a meter 42.

The contents of the primary reactor 36 are stirred continuously by a suitable agitator, which may be of the paddle type, 44, and a strong reaction between the ammonia and acid takes place in the solution therein, with a considerable amount of heat being liberated. The heat works the thermostat probe 32 to admit more cold water through valve 30, limiting the activity of the reaction, cooling the reactor 36, and resulting in a uniform flowing slurry mixture of diammonium and monammonium phosphate in water.

This slurry is pumped by a pump 50 over a line 48 from the primary reactor 36 to a secondary reactor 52, part of an ammoniator-granulator combination. Here, over a tumbling bed of recycled fines from the output, anhydrous ammonia ($NH_3$) is introduced over a line 54. A meter 56 is used in this line 54 to assure that excess ammonia is present to complete the reaction.

The moist thickened diammonium phosphate tumbles over an overflow arrangement 62 into a rotating granulator-dryer 64. The excess ammonia along with water vapor from the heat of the reaction is lead off over an exhaust 58 and introduced into the previously mentioned scrubber 22 to react in the preneutralizing step mentioned in that connection.

Since agitation in the primary reactor 36 also results in some fuming of the ammonia, this vapor too is introduced to the exhaust line 58 through a line 46.

The fumes leaving the scrubber 22 to the atmosphere over an exhaust line 60 are mostly water vapor showing that the ammonia content has been fully neutralized in the feed back.

The output of the dryer at 66 is composed of a hot, dry mixture of various sized particles and granules of ammonium phosphates and must be sized before being an acceptable product of manufacture. This is most efficiently done by discharging it through a gate 68 and line 70 to the input end of an uphill classifier arrangement 72 of screens and moving brushes, as covered in U.S. Letters Patent No. 3,321,079, issued May 23, 1967 to Walter J. Sackett, Sr., for "Method and Apparatus for Classifying Dry Solids." The oversize lumps of material are discharged from the classifier 72 over a line 74 to a mill 76 where they are broken up. The output 78 of the mill 76 passes a gate 80 and is returned over a line 82 to the input line 70 of the classifier 72.

Acceptable size product output 84 is shunted by a gate 86 to a product delivery line 88 for bagging or bulk delivery. The gate permits a recycling of output product through line 90 if required for proper maintenance of the secondary reactor bed if required.

The fines from classifier 72 supplement this returned material over the line 92, with any entrapped air being removed by cyclones 94. Thence, a surge hopper 96 feeds a continuous weight scale 98 which accurately charges the tumbling bed in the reactor 52 over the return line 100. Valve 80 also provides selective means for returning crushed oversize to the process through line 108 connecting with line 92. There are other times when it is desirable to return to the process a combination of hot recycle as well as partially by-passed product. To accomplish this, a third line 120 from valve 86 in line 84 transfers the product to the cooler 104 and through the discharge line 122 to the line 88 for bagging or bulk delivery. Additionally, valve 86 serves to by-pass a portion of the product along with the fines which are recycled through the line 92 to the secondary reactor 52 through the surge hopper 96 and continuous scale 98.

Sometimes, it is not desirable to deliver a hot product, for example, to asphalt lined bags. In such case, a rotary cooler 104 is introduced by directing the output 66 of the dryer 64 from line 70 to a line 102 (shown dotted). The output line 106 of the cooler then feeds the classifier with a cooled product as shown by the arrows. The output 78 of the mill 76 is also switched by gate 80 at this time to feed a return line 108.

Obviously, many other modifications and variations of the present invention are possible in light of the above teachings. It is, however, to be understood that within the scope of the appended claims the invention may be practiced otherwise than as specifically described.

What is claimed is:

1. In a manufacturing system for the production of ammonium phosphate including, in operative successive connection, scrubber means, primary reactor means, and secondary reactor means, and having means for introduction of ammonia and phosphoric acid in said system, the improvement comprising: means for introducing ammonia and dilute phosphoric acid simultaneously into the primary reactor, means for introducing water separately and concurrently therewith into the primary reactor in proportion to the reactive quantities of all said dilute phosphoric acid and ammonia being introduced, temperature controlling means including water valving means connected to the primary reactor and responsive to the heat of concurrent reaction in the reactor thereby regulating said reaction and said ammonium phosphate reaction product and means including a drain in the bottom of the reactor and a pump adapted to exhaust the contents of the reactor continuously therethrough.

2. In a manufacturing system as recited in claim 1, the additional improvement comprising means for rotary mixing of all said ammonia, water and phosphoric acid during reaction therebetween on passage through said primary reactor.

3. In a process for production of ammonium phosphate reaction slurry by introduction of ammonia and dilute phosphoric acid into a reactor, the improvement comprising the steps of regulating and unifying slurry production by direct concurrent introduction of water directly into the reactor in specific ratio to the reactive quantities of ammonia and dilute phosphoric acid being introduced into the reactor, measuring the temperature of said reaction, and adding water to the reaction in a proportion bringing the temperature of the reaction to a pre-determined level.

4. In the process recited in claim 3, the additional improvement comprising the step of keeping said temperature determination current and thereby refining said uniformity of product, by pumping the lowermost portion of said slurry from said reactor serially as formed.

5. In the process recited in claim 4, the additional improvement comprising the step of refining said temperature determination and said uniformity of product by rotary mixing of all said ammonia, water, and phosphoric acid together concurrently with reaction therebetween on passage through the reactor.

References Cited

UNITED STATES PATENTS

| 2,891,856 | 6/1959 | Getsinger et al. | 71—43 |
| 2,963,359 | 12/1960 | Moore et al. | 71—64 |
| 3,010,801 | 11/1961 | Schulze | 23—259.1 |
| 3,178,267 | 4/1965 | Larson | 23—259.1 |
| 3,249,421 | 5/1966 | Bigot et al. | 71—64 |
| 3,252,764 | 5/1966 | Bruno, Jr. | 23—259.2 |
| 3,382,059 | 5/1968 | Getsinger | 71—34 |

REUBEN FRIEDMAN, Primary Examiner

C. N. HART, Assistant Examiner

U.S. Cl. X.R.

23—259.2; 71—43